United States Patent [19]
Raber

[11] Patent Number: 6,027,292
[45] Date of Patent: Feb. 22, 2000

[54] EXPANSION ANCHOR WITH TABS HAVING A CHANGING CURVATURE RADIUS

[75] Inventor: Stefan Raber, Kaufering, Germany

[73] Assignee: Hilti Aktiengesellschaft, Schaan, Liechtenstein

[21] Appl. No.: 09/030,570

[22] Filed: Feb. 25, 1998

[30] Foreign Application Priority Data

Mar. 8, 1997 [DE] Germany .......................... 197 09 567

[51] Int. Cl.$^7$ .................................. F16B 13/06
[52] U.S. Cl. ........................... 411/71; 411/60.1; 411/60.3
[58] Field of Search .................. 411/57.1, 55, 60.1, 411/61, 71, 72, 73, 60.2, 60.3

[56] References Cited

U.S. PATENT DOCUMENTS

| | | | |
|---|---|---|---|
| 3,107,570 | 10/1963 | Zifferer | 411/60 |
| 3,922,947 | 12/1975 | Leonardo | 411/60 |
| 4,474,516 | 10/1984 | Schiefer . | |
| 4,518,290 | 5/1985 | Frichmann | 411/30 |
| 4,968,200 | 11/1990 | Mark . | |
| 5,137,395 | 8/1992 | McCartney | 411/62 |
| 5,441,372 | 8/1995 | Wilkinson | 411/60 |

FOREIGN PATENT DOCUMENTS

| | | |
|---|---|---|
| 0195188 | 9/1986 | European Pat. Off. . |
| 3031048 | 3/1982 | Germany . |
| 661569 | 7/1987 | Switzerland . |

*Primary Examiner*—Flemming Saether
*Attorney, Agent, or Firm*—Brown & Wood, LLP

[57] ABSTRACT

An expansion anchor including an anchor rod (1) having a head (2) widening in an insertion direction S; and a sleeve (3) having a plurality of expansion tabs (6) separated from each other by slots (5) and extending from a plastic hinge (4) toward a free front end (7) of the sleeve (3), the expansion tabs (6) expanding radially upon relative displacement of the sleeve (3) and the anchor rod (2) and having each at least one groove-like depression (8 or 9) which opens in a region of the free front end (7) and extends at least along a portion of an axial length (1) of an expansion tab (6), with the groove-like depression (8 or 9) being inclined toward a straight line (G) extending parallel to a sleeve axis (A).

4 Claims, 2 Drawing Sheets

EXPANSION ANCHOR WITH TABS HAVING A CHANGING CURVATURE RADIUS

BACKGROUND OF THE INVENTION

1. Field of the Invention

The present invention relates to an expansion anchor including an anchor rod having a head widening in an insertion direction, and a sleeve having a plurality of expansion tabs separated from each other by slots and extending from a plastic hinge toward a free front end of the sleeve, with the expansion tabs expanding radially upon relative displacement of the sleeve and the anchor rod.

2. Description of the Prior Art

Expansion anchors of the above-described type are inserted in preliminary formed bores provided in structural components and are anchored there by radial expansion of the expansion tabs. The expansion anchors are secured in the structural component by an expansion force which is applied by the expansion tabs to the wall of respective bores. When so-called undercut systems are used, the anchoring is provided by a form-locking connection which the radially expanded expansion tabs form with an undercut provided in the bore. Undercut systems are subdivided into conventional systems in which after a bore is formed, an undercut is formed in a separate step with a special tool, and into self-cutting systems in which undercut is formed in the bore wall upon a radial expansion of the expansion tabs. To this end, in the self-cutting systems, the expansion tabs are provided with cutters which mill or chisel the bore wall of a structural component.

In the known systems, the expansion tabs have substantially cylindrical outer surfaces. This initial geometry of the expansion tabs corresponds to the geometry of the undercut, which is usually cone-shaped, only to a very small extent. The abutting surfaces of the expansion tabs and of the undercut have curvatures deviating from each other in both circumferential and axial directions of the expansion tabs. Therefore, the application of a load to a structural component is not uniform. During application of forces to the structural component, in some regions, very high surface pressures occur which may lead to destruction of the structural component and may result in the reduction of the load value. Further, the geometry of the expansion tabs and the anchor rod head also often do not correspond to each other in the conventional systems. In many cases, the head has a conical or trumpet-shaped outer surface, while the expansion tabs, which are defined by slots formed in the cylindrical sleeve, have a cylindrical surface. It is immediately clear, that under these conditions, the curvature radii of the abutting surfaces deviate from each other. The occurring linear contacts, which are caused by different curvature radii, result in cold welding which prevents a secondary expansion in a torn structural component in an opening bore.

Accordingly, an object of the present invention is to eliminate the drawbacks of the known expansion anchor, in particular, that used in undercut systems. When an anchor is loaded, the load should be introduced into the structural component gently to prevent any destruction. Cold welding between the expansion tabs and the anchor rod head need be prevented. The rigidity of the system expansion anchor-structural component should be improved.

SUMMARY OF THE INVENTION

These and other objects of the present invention, which will become apparent hereinafter, are achieved by providing an expansion anchor including an anchor rod having a head widening in an insertion direction, and a sleeve having a plurality of expansion tabs separated from each other by slots and extending from a plastic hinge toward a free front end of the sleeve, with the expansion tabs expanding radially upon relative displacement of the sleeve and the anchor rod. Each of the expansion tabs has at least one groove which opens in a region of the free front end of the sleeve and extends at least along a portion of an axial length of an expansion tab. The groove is inclined toward a straight line extending parallel to a sleeve axis and is spaced from the straight line by a largest distance at a location where it opens in the region of the front end of the sleeve.

The inventive features provide for changing of the curvature radius of the expansion tabs during the expansion process. The groove function as plastic hinges and enable a continuous accommodation of the expansion tabs to the geometry of the head and an undercut. The grooves are provided in the regions of the biggest deformations. Though they extend from the free front end at least over a portion of a longitudinal extent of the expansion tabs, the expansion tabs can be adapted to the regions of the head having the biggest diameter. Thereby the expanded expansion tabs flatly abut the outer surface of the head and the bore wall in the undercut area to the greatest possible extent. This insures the most possible gentle introduction of a load into the structural component and prevents excessive surface pressures between the abutting surfaces of the expansion tabs and the head which result in cold welding and may prevent a relative displacement between the sleeve and the head. A better adaptation of the geometry of the abutting surfaces of the expansion tabs and the structural component to each other improves the rigidity of the entire system.

In order to insure a most complete adaptation of the curvature radii of the expansion tabs along the longitudinal extent of the expansion tabs, the grooves advantageously extend along the entire length of the expansion tabs and open into the free front end of the sleeve.

By providing each expansion tab with two or more grooves which extend linearly along the longitudinal extent of the expansion tab and form together an angle of greater than 0° and up to 60°, preferably between 10° and 50°, the adaptation of the geometry of the expansion tabs, the head and the undercut can be further improved. This is particularly the case when the outer surface of the head advantageously has a cone angle from about 25° to about 90°. The angle formed by the grooves depends on the cone angle of the head outer surface. With a large cone angle, the grooves form a large angle therebetween. They form a smaller angle therebetween when the cone angle of the outer surface of the head is smaller. The grooves form an angle in the range from 9° to about 19°, preferably about 14°, for a cone angle of 30°. For a cone angle of 40°, the angle formed by two depressions is equal from about 14° to about 24°, preferably 19°. To a cone angle of the outer surface of the head of 60°, corresponds an angle in the range from about 22° to about 32°, preferably 27°. For a very large cone angle of about 80°, the angle formed by the two groove-like depressions is equal to from about 30° to about 40° and, preferably, 35°.

The grooves can have a different width along their length. The curvatures of the abutting surfaces of the expansion tabs and the outer surface of the head deviate less from each other in the region of the plastic hinge than in the region of openings of the grooves. Therefore, for adaptation of the curvatures in the region of the plastic hinge, a smaller width of the groove-like depressions suffices. Advantageously, the ratio between the widths of a groove in the region of its opening and at the plastic hinge is in a range from about 1:1 to about 10:1.

Because the deviations of the geometry, in particular of the curvature radii, of the abutting surfaces of the expansion tabs and the head outer surface at the plastic hinge and in the region of openings of the grooves are different, different deformation steps are necessary along the longitudinal extent of the expansion tabs. For the optimization of the deformation steps, it is advantageous when the residual material of the expansion tabs at the base of the groove-like depression has a different thickness along the depression longitudinal extent. In the region of the plastic hinge, a smaller deformation is necessary than in the region of the openings of the grooves, e.g., at the free end surfaces of the expansion tabs. Therefore, the residual material thickness at the plastic hinge can be greater than at the free front ends of the expansion tabs. Advantageously, the ratio of thicknesses of the residual material in the opening region of the grooves and at the plastic hinge is in the range from about 1:1 to about 1:10.

The grooves, which act as axial hinges, can in principle be formed on the outer sides of the expansion tabs adjacent to the bore wall or on their head-abutting surfaces. When a plurality of grooves are formed on each expansion tab and at least one of the plurality of expansion tab is formed on its outer surface, different material loads of both elements, inner tension, outer pressure is better distributed over the surface of the expansion tabs with the adaptation of their geometry. It should be understood that with the groove-like depression being formed on the outer surfaces of the expansion tabs, the manufacturing is simplified, in particular when machining is used.

An advantageous manufacturing of the expansion anchor according to the present invention takes place when non-machining processes are used for producing the grooves, e.g., stamping or rolling. These manufacturing processes are particularly suitable when the sleeve is formed as a sheet material stamped bent component.

Not all expansion tabs should have the same number of grooves. E.g., the number of depressions on following each other expansion tabs can be different or the width or the depth of the depressions on the following each other expansion tabs can vary. This permits to further optimize adaptation of the geometry of the abutting surfaces.

The grooves can extend at least along a portion of the longitudinal extent of the tabs. At that, for obtaining a higher pull-out value, it is advantageous when the expansion tabs have a length equal to or greater than the length of anchor rod head.

BRIEF DESCRIPTION OF THE DRAWINGS

The features and objects of the present invention will become more apparent, and the invention itself will best understood from the following detailed description of the preferred embodiments when read with reference to the accompanying drawings, wherein.

DETAILED DESCRIPTION OF THE PREFERRED EMBODIMENT

Figure 1:
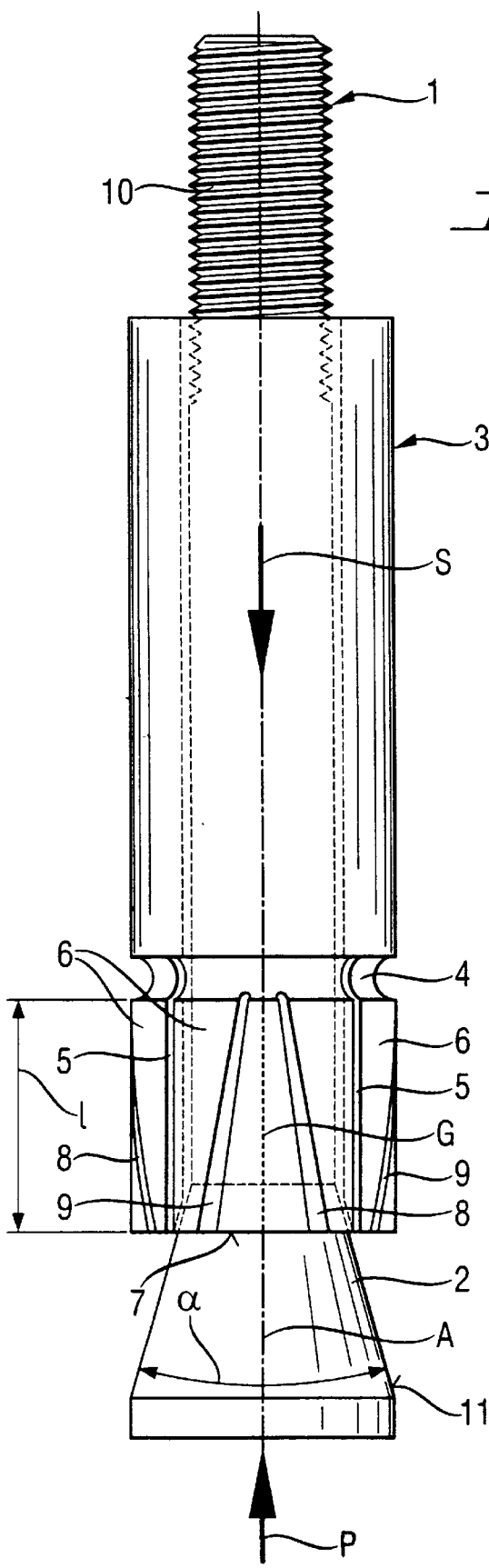
FIG. 1 is a side elevational view of an expansion anchor according to the present invention.

An expansion anchor according to the present invention, which is shown in FIG. 1, includes an anchor rod 1 having a head 2 widening in the insertion direction S. The head 2, as shown in the drawings, has a substantially conical shape. The head 2 can also have an outer surface 11 which widens in the insertion direction S in a form of a trumpet. At its opposite end, the anchor rod 1 is provided with load application means 10, e.g., an outer thread. A cylindrical sleeve 3 is supported on the anchor rod 1 with a possibility of an axial displacement therealong. In its end region adjacent to the head 2, the sleeve 3 has a plurality of expansion tabs 6 separated from each other by axial slots 5. The expansion tabs 6 extend from a plastic hinge 4 toward the front end 7 of the sleeve 3. The hinge 4 is formed by an annular groove extending transverse to the axis A of the anchor. When the sleeve 3 is pushed over the head 2 in the insertion direction S, the expansion tabs 6 expand radially. The expansion tabs 6 have an axial length 1 which is equal to or exceeds the length of the head 2.

Figure 2:
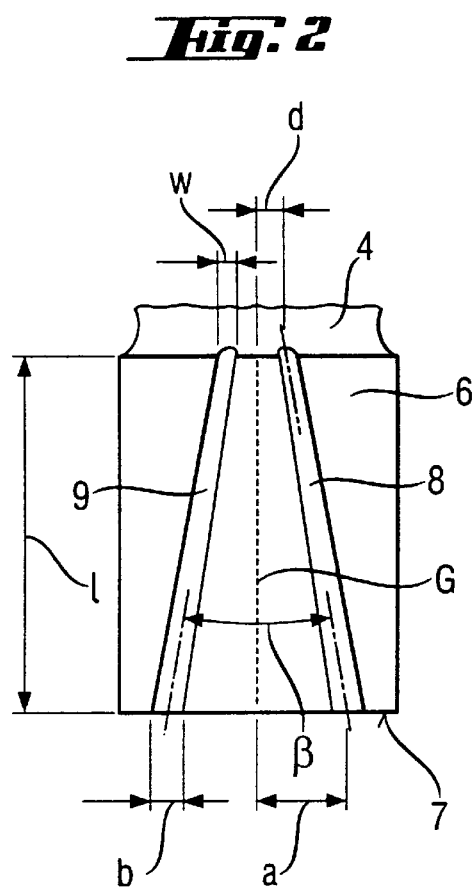
FIG. 2 is a side elevational view of expansion tabs formed according to the present invention.

As shown in FIGS. 1 and 2, each expansion tab 6 has grooves 8 and 9 extending from the front end 7 toward the hinge 4. As shown in FIGS. 1–2, the grooves 8 and 9 extend along the entire length 1 of the tabs 6 and are open at the front end 7 of each expansion tab. However, the grooves 7 and 8 can end somewhere along the length of an expansion tab 6. Preferably, the grooves 8 and 9 extend linearly and, in non-expanded condition, are inclined with respect to a straight line G which extends parallel to the axis A of the expansion anchor. At the hinge 4, the grooves 8 and 9 are spaced a small distance d from the line G, and at the front end 7, they are spaced from the line G a distance a. The grooves 8 and 9 can be provided, as shown in the drawings, in the outer surfaces of the expansion tabs 6. According to one embodiment of the present invention, however, the grooves 8, 9 can be formed in the surfaces of the expansion tabs 6 adjacent to the outer surface 11 of the head 2. They can also be formed on both inner and outer surfaces of the expansion tabs 6. The grooves 8 and 9 can be formed by machining or non-machining methods, e.g., by stamping or rolling. The non-machining methods are preferable when the expansion anchor sleeve is formed as a sheet metal stamped bent component.

The angle $\beta$ (FIG. 2), which the grooves 8 and 9 form with each other, depends on the average cone angle $\alpha$ (FIG. 1) of the outer surface 11 of the head 2. A smaller angle a of the outer surface 11 is respectively associated with a smaller angle $\beta$. The grooves 8 and 9 form an angle $\beta$ in the range from 9° to about 19°, preferably about 14°, for a cone angle $\alpha$ of 30°. For a cone angle $\alpha$ of 40°, the angle $\beta$ is equal from about 14° to about 24°, preferable 19°. To a cone angle 2 of the outer surface 11 of the head 2 of 60°, corresponds an angle $\beta$ in the range of about 22° to about 32°, preferably 27°. For a very large angle $\alpha$ of about 80°, the angle $\beta$ is equal to from about 30° to about 40° and, preferably, 35°.

In the case when an expansion tab 6 has only one grooves 8 or 9, the angle $\beta$ is halved. It is then corresponds to the angle of inclination of the groove 8 or 9 to the straight line G.

Figure 3:
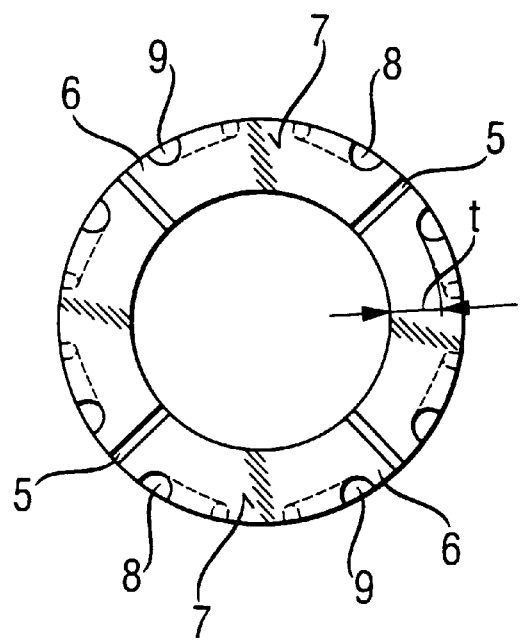
FIG. 3 is a bottom view in a direction of arrow P in FIG. 1 of an unexpanded sleeve of the expansion anchor without the anchor rod.
Figure 4:
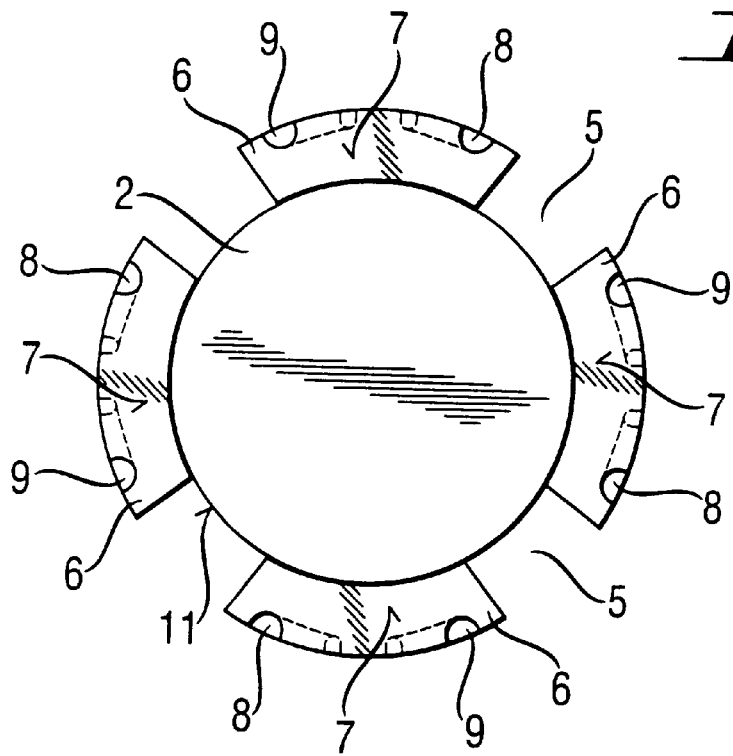
FIG. 4 is a view similar to that of FIG. 3 with an anchor rod with radially expanded expansion tabs.

FIGS. 3 and 4 show similar views of the expansion anchor in the direction of arrow P in FIG. 1. For better overall view, the anchor rod 1 is omitted in FIG. 3. The view of the front end 7, which is the view shown in FIG. 3, clearly shows that the expansion tabs 6 are separated from each other by slots 5. The expansion tabs 6 have the grooves 8 and 9 opening into end surface defining the front end 7. At the bases of the grooves 8 and 9, the expansion tabs 6 have a residual material with a thickness t which may very along the axial extent of the grooves 8 and 9. The residual material thickness t at locations where the grooves 8 and 9 open into the front end 7 is equal to or smaller than the thickness t of the grooves 8 and 9 at the hinge 4. FIG. 4 shows a front end 7 of the sleeve 3 in a position in which the sleeve 3 is pushed over the head 2. The grooves 8, 9, which are provided in the outer surface of the expansion tabs 6, function as axial plastic hinges end provide for abutment of the expansion tabs 6 against the outer surface 11 of the head 2 substantially along their entire surface. The plastic hinges, which are defined by the grooves 8, 9, provide for adaptation of the expansion tabs 6 to the curvature of the outer surface 11 of the head 2.

The particular shape of the expansion tabs according to the present invention proved to be particularly advantageous for undercut systems. The possibility of the adaptation of the curvature of expansion tabs to the curvature of the outer surface of the anchor rod head provides for flat abutment of the expansion tabs against the anchor rod head. This increases the rigidity of the dowel system which is particular advantageous for self-cutting undercut systems. The axial plastic hinges, which are formed by the groove-like depressions improve the abutment of the expansion tabs against the structural component and provide for gentle application of a load to the component.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An expansion anchor, comprising an anchor rod (1) having a head (2) widening in an insertion direction (S); and a sleeve (3) having a plurality of expansion tabs (6) separated from each other by slots (5) and extending from a plastic hinge (4) toward a free front end (7) of the sleeve (3), the expansion tabs (6) expanding radially upon relative displacement of the sleeve (3) and the anchor rod (2) and having each at least two grooves (8 or 9) which open in a region of the free front end (7) and extend linearly along an axial length (1) of each of the expansion tabs (6), the grooves (8, 9) being inclined toward a straight line (G) extending parallel to a sleeve axis (A) and being spaced from the straight line (G) by a largest distance (a) at a location where they open in the region of the free front end (7), wherein an outer surface (11) of the head (2) has a cone angle (α) amounting to from about 25° to about 90°, and the at least two grooves (8, 9) form with each other an angle (β) from above 0° to 60°, and wherein a smaller angle (β) between the at least two grooves (8, 9) corresponds to a smaller cone angle (α) of the head outer surface (11).

2. An expansion anchor according to claim 1, wherein the angle (β) between the at least two grooves (8 and 9) is equal from about 10° to about 50°.

3. An expansion anchor, comprising an anchor rod (1) having a head (2) widening in an insertion direction (S); and a sleeve (3) having a plurality of expansion tabs (6) separated from each other by slots (5) and extending from a plastic hinge (4) toward a free front end (7) of the sleeve (3), the expansion tabs (6) expanding radially upon relative displacement of the sleeve (3) and the anchor rod (2) and having each at least one groove (8 or 9) which opens in a region of the free front end (7) and extends at least along a portion of an axial length (1) of each of the expansion tabs (6), the groove (8 or 9) being inclined toward a straight line (G) extending parallel to a sleeve axis (A) and being spaced from the straight line (G) by a largest distance (a) at a location where it opens in the region of the free front end (7), wherein a ratio between widths of the at least one groove (8, 9) at the region of the free front end (7) and at the plastic hinge (4) is in a range from about 1:1 to about 10:1.

4. An expansion anchor, comprising an anchor rod (1) having a head (2) widening in an insertion direction (s); and a sleeve (3) having a plurality of expansion tabs (6) expanding radially upon relative displacement of the sleeve (3) and the anchor rod (2) and having each at least one groove-like depression (8 or 9) which opens in a region of the free front end (7) and extends at least along a portion of an axial length (10 of each of the expansion tabs (6), the groove-like depression (8 or 9) being inclined toward a straight line (G) extending parallel to a sleeve axis (A) and being spaced from the straight line (G) by a largest distance (a) at a location where it opens in the region of the free front end (7), wherein an expansion tab (6) has a residual material at a base of the at least one groove (8, 9), and wherein the thickness of the residual material at the region of the free front end (7) and at the plastic hinge (4) have a ratio in a range from about 1:1 to about 1:10.

* * * * *